United States Patent [19]

Gianforcaro

[11] Patent Number: 4,837,554
[45] Date of Patent: Jun. 6, 1989

[54] MOTOR VEHICLE BRAKE-STATE OF MOTION SIGNAL-LIGHTS INDICATOR

[76] Inventor: Anthony Gianforcaro, 122 Woodward La., Basking Ridge, N.J. 07920

[21] Appl. No.: 231,262

[22] Filed: Aug. 12, 1988

[51] Int. Cl.$^4$ .............................................. B60Q 01/26
[52] U.S. Cl. ..................................... 340/468; 340/464
[58] Field of Search ............................... 340/66, 71, 72

[56] References Cited

U.S. PATENT DOCUMENTS

| | | | |
|---|---|---|---|
| 1,335,610 | 3/1920 | Schram | 340/66 |
| 3,364,384 | 1/1968 | Dankert | 340/66 |
| 3,375,496 | 3/1968 | Antunovic | 340/66 |
| 3,444,514 | 5/1969 | Yang | 340/66 |
| 4,491,824 | 1/1985 | Chiou | 340/66 |

*Primary Examiner*—Joseph A. Orsino, Jr.
*Assistant Examiner*—Annie H. Chau
*Attorney, Agent, or Firm*—William T. Hough

[57] ABSTRACT

In a preferred embodiment, there is provided a combination of circuitries and signaling lights all fed through a brake-actuation switch in electrical circuit series, such that none of the signaling lights are operative except when the brake is applied. There are two basic signaling light circuitries and lights. The first is operative when a motion indicator switch registers that the automobile is in motion, thereby closing circuit, causing those lights to be lighted or flashing. There is a separate second circuit and lights which become activated when there is no motion, i.e. when motion has terminated if the brake is still being applied. The motion switch has the alternative positions and is preferably connected to the speedometer or other conventional motion-indicator not requiring any newly manufactured motion switch. Each of the separate light circuitries and lights thereof have lights on the front of the automobile and on each of the left and right faces of the automobile near the front of the automobile. Thereby, an oncoming driver or a person or driver on either side of the automobile may be thus advised readily as to the state of braking and movement or non-movement of this motor vehicle. The lights indicating motion—when the brake is depressed, are red, while the lighs indicating no motion—when the brake is depressed, are green.

16 Claims, 1 Drawing Sheet

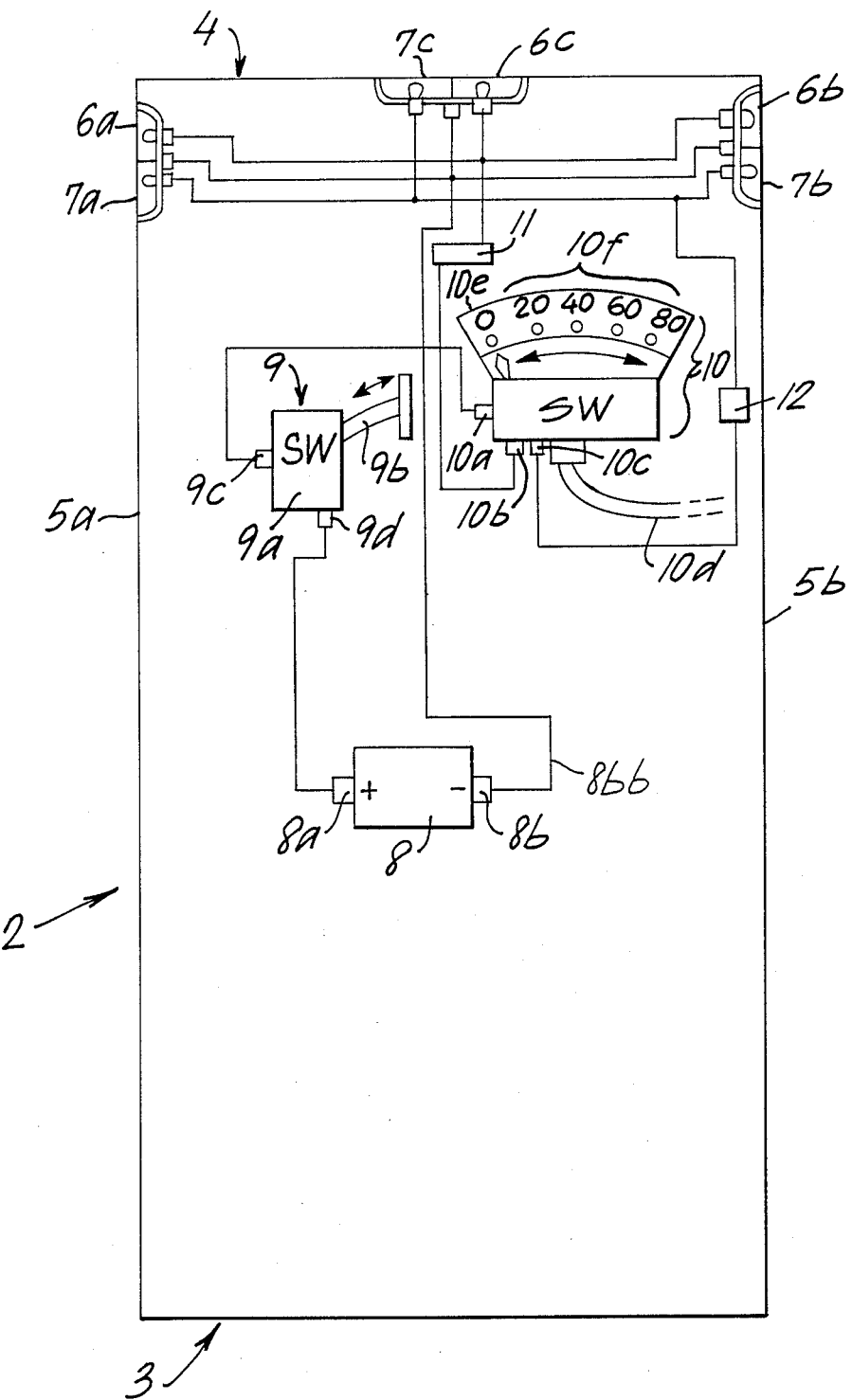

MOTOR VEHICLE BRAKE-STATE OF MOTION SIGNAL-LIGHTS INDICATOR

This invention is directed to an improved signaling device for indicating to oncoming drivers as well as drivers on each or either side of an intersection, for example, the state of braking and of motion of the motor vehicle having the improved signaling device.

BACKGROUND TO THE INVENTION

Prior Art

While no relevant prior art was discovered, the Schanblin U.S. Pat. No. 2,496,601 discloses a light mounted on a flexible rod, as mounted on the left side face of an automobile so that the light will be waived back and forth when the brake is applied, and the light will be turned on when the brake is applied, and turned off when the brake is released. Another patent, equally unrelated, is Wang U.S. Pat. No. 3,444,514 which provides two rearwardly-directed signal lights of different colors so that a person rearward of the automobile may see which of two colored lights are on, one indicating that the brakes are applied, the other indicating that the brakes are not applied. That same patent has a totally independent and separate motion sensor and circuitry thereof indicating when "on" that the automobile is in motion. The motion indicator and the light circuitry and the lights thereof are totally independent of the brake circuitries and lights thereof and of the motion sensor. In another equally unrelated patent, the Thurman U.S. Pat. No. 4,594,574 front and rearward signal lights of this patent are actuated and lighted thereby solely when the brake is applied when simultaneously and concurrently the automobile is in motion. Accordingly, the Thurman patent differs from a conventional brake light only in that the light is on solely as long as the motion has continued.

STATE OF THE ART

Prior to the present invention, there has not existed any suitable means for other drivers such as oncoming drivers as well as other drivers at side street and/or at intersections, to have any reliable indication as to the immediate intentions of the driver as well as state of being of the approaching automobile or other vehicle, to which this invention is directed, with regard to braking, considered together with motion or lack of motion of the motor vehicle. While there have existed patents which relate, for example, to the turning-on manually of special signals to thereby indicate to a pedestrian that he or she may walk in front of the car, or to warn a following driver that a pedestrian may walk in front of the car so that the following vehicle will not attempt to pass, these types of devices as to their activation are strictly subjectively optional and discretionary switches which may or may not be activated by the driver of the automobile. Also, such are unrelated to and independent to the thought of giving an oncoming driver or sidewardly-positioned viewer, the state of the automobile as governing the intention of the driver of the automobile having the signaling device of this invention, prior to the present invention. Such drivers could not know whether a vehicle having the brake applied, had or had not stopped completely or was still stopped completely. In short, there was no reliable indication to the other drivers, as well as no lights position readily visible to oncoming and/or sidewardly-located drivers and/or pedestrians. Also, there was no clear all-clear signal, as a part of prior systems. More particularly, when an automobile is sitting at an intersection in a stopped position or state, the stopped automobile may or may not have "on" (depressed) the brakes and have on the brake lights—which in any event can be seen normally solely from the rearward directions—except for possibly the above-noted patent which would make the normal brake lights also viewable from a forwardly-located position—but by the Thurman patent, even then such forwardly-located brake lights would be viewable only when the vehicle was still in motion. Accordingly, the oncoming automobiles' drivers have no way of knowing the exact state of affairs or intentions of the approaching automobile at the time after the brakes have been released. That is to say, that the automobile previously stopped at the intersection may already again be accelerating and again be a major and dire threat or hazard to oncoming automobiles, devoid of any indication thereof. Accordingly, oncoming drivers and the like are devoid of any positive indication of the state of the automobile that had previously stopped. Moreover, as above-noted, the oncoming motorists cannot see the tail lights of oncoming cars at the intersection, as conditions truly exist on the highways today. Even if such brake lights were visible, there is no indication available heretofore indicating whether or not motion has again begun—as opposed to a positive signal indicating whether the brake is applied devoid of motion. As a result of these uncertain conditions, driving remains hazardous and uncertain as to safety if oncoming drivers proceed, or turn ahead of the previously braked automobile, or the like. Even if there were forward lights such as shown by the Thurman patent, with the previously discussed limitations, drivers on intersecting roads or highways or streets, at an intersection cannot reliably see or discern forwardly-positioned lights any significantly better than they can see rearward tail lights.

OBJECTS OF THE INVENTION

Accordingly, objects of this invention include the overcoming or avoiding of problems and/or difficulties of the types discussed-above, together with the obtaining of other novel advantages.

Another object more particularly includes a signaling system that will provide the current information as to whether or not the stopping or stopped automobile ahead or sideward, is or is not moving forwardly or is in a stationary condition during the applying of the brake.

Other objects become apparent from the preceding and following disclosure.

The objects are obtained by the invention as described above and hereinafter.

SUMMARY OF THE INVENTION

Broadly this invention is directed to a motor vehicle signaling device which includes a combination of several elements. There is provided a power source mechanism providing direct electricity, and having a positive terminal as a positive outlet, and having a negative terminal as a negative ground. Additionally, in combination there is provided a brake-switch mechanism for making and breaking electrical circuitry, with a brake-switch electrical inlet terminal and also having a brake-switch electrical outlet terminal. There is also provided, in the combination, a brake switch power-input circuit that includes a brake switch power lead connected between the above-noted power positive outlet terminal and the brake switch electrical power input terminal. There is a first forward signaling light mechanism for mounting on at least a forward face of a motor vehicle, this forwardly-directed signal light mechanism being mounted in a position in a manner such that any lights thereof are viewable from a forwardly direction such as oncoming drivers; they have a forward-light input terminal and a forward-light outlet terminal. There is provided also in the broad combination, a motion switch combination a motion switch mechanism which includes a motion switch electrical power input terminal and at-least a first motion switch electrical outlet terminal. The motion switch mechanism is adapted to direct electric current from the motion switch inlet terminal to the motion switch outlet terminal when the motor vehicle on which the motion switch is mounted is in motion, and also for braking electrical circuit to the first motion switch when the motor vehicle is not in a state of motion. Also as a part of the broad combination, there is a motion switch first power electrical lead connected between the above-noted first motion switch electrical power outlet terminal and the first forward light electrical input terminal. Also as a part of the combination, the brake switch power input circuit additionally includes a brake circuit ground lead connected between the first forward light electrical outlet terminal and the main electrical ground negative terminal, thereby providing for the first light to become activated by receiving electrical power when simultaneously the brake switch mechanism is in an electrical closed-circuit state resulting from a brake pedal being applied while simultaneously the motor vehicle is in a motionless state. In a preferred embodiment, the forward signal light mechanism includes a second forward light and a second forward light input terminal and a second forward light output terminal, for conducting electricity to and from the second forward light, and the second forward light output terminal is connected in electrical circuit with the above-noted main ground negative terminal. In this preferred embodiment, the motion switch mechanism includes a second motion switch power outlet terminal. Also in this preferred embodiment, there is included a motion switch power lead connected between the above-noted second forward light input terminal and the above-noted second motion switch power outlet terminal. In this preferred embodiment, the motion switch mechanism is further adapted for making electrical circuit between the motion switch power input terminal and the second motion switch power outlet terminal when the motor vehicle is in motion; as well, it is for breaking electrical circuit between the motion switch power input terminal and the second motion switch power outlet terminal when the motor vehicle is in a motionless state. Thereby, when the brake of the motor vehicle is applied and when the motor vehicle is still remaining in motion, the second light is energized as contrasted to when the brake remains applied and the motor vehicle has ceased its motion at which time the first light becomes deactivated and the second light becomes turned-on to provide its light. Preferably the first and second lights include in this embodiment physical differences by which an observer may distinguish one from the other, as a viewer thereof.

In a further preferred embodiment, the first message-conveying mechanism for the first light imparts at least some of the physical differences thereto and this further additional preferred embodiment also including a second and different message-conveying mechanism (as compared to the first message-conveying mechanism), for the second light and imparting some of the above-noted physical differences noted above, such that the first and second lights are distinguishable one from the other when respectively lighted.

In another preferred embodiment, the first message-conveying message mechanism includes a color imparting structure by which the first light is a first color and includes also a second color imparting structure by which the second light is a second color different from the first color, whereby the first light when activated is distinguishable readily from the second light when activated by virtue of their different colors when observed by a viewer. In another preferred embodiment of the invention, the first color imparting mechanism causes the first light to impart a green light, and in which the second color imparting mechanism causes the second light to impart a red light, as observable by a viewer, the lights being located and positioned for accessible viewing.

In another preferred embodiment, there are included first and second side-viewable lights and mechanisms thereof for mounting on a motor vehicle and on a right side thereof, respectively, such that the lights of each of the left and right sides may be viewed from each of positions to the left and to the right of the motor vehicle. Also in this preferred embodiment, the first right and left side-viewable light mechanism has at-least first right and left side lights, and the second right and left side-viewable has at-least second right and left side lights, and the first side-viewable lights mechanism has first right and left side light electrical power input terminal(s) and a first right and left side light ground terminal(s) thereof, and the second side-viewable lights mechanism has a second right and left side light electrical power input terminal(s) thereof and second right and left side light ground terminal(s) thereof. In this particular preferred embodiment, the motion switch first power lead is connected between the first motion switch power outlet terminal and the first right and left side lights, and includes a second switch power lead connected between the first motion switch second power outlet terminal and the first right and left side lights. This preferred embodiment also includes for the second switch circuit lead, that it is connected between the main ground negative terminal and each of the first and second side light ground terminals. Accordingly, the first and second ground lights and the first forward light become simultaneously and concurrently electrically energized and lighted when simultaneously the brake is applied (in the applied state) and when concurrently the motor vehicle is simultaneously and concurrently motionless. Also accordingly, the second side lights and the second forward light become electrically energized and lighted when simultaneously the vehicle brake is applied if and when the motor vehicle is concurrently or simultaneously in motion.

In another preferred embodiment, the color imparting means, in association with the first and second side lights, cause the first right and left side lights to be viewed as green lights when observed by a viewer, and causes the second side lights to be viewed as red lights when observed by a viewer.

The invention may be better understood by making reference to the following FIGURE.

THE FIGURE

The FIGURE diagrammatically and symbolically illustrates the circuitry of the broad and preferred embodiments as described above. This FIGURE shows the circuitry and lights and motion switch and brakes and the like, connected in electrical circuitries, as described hereinafter.

DETAILED DESCRIPTION

This FIGURE discloses a symbolic motor vehicle 2 having a front end 4 and a rear end 3, and a left side 5a and a right side 5b. Mounted on a forward left side of the motor vehicle, is a light broadly identified as 6a, and mounted on the right side of the motor vehicle is a light broadly identified as 6b. Likewise, mounted on a forward left side of the motor vehicle is a light broadly identified as 7a, and mounted on the forward right side of the motor vehicle is a light broadly identified as 7b. Mounted on a forward portion of the automobile, on the front of the automobile, is a light broadly identified as light 6c, and a different other light broadly identified as light 7c. Diagrammatically positioned merely for purposes of illustration, there is disclosed a battery 8 symbolically represented, and symbolically represented having its positive electrical terminal 8a and its negative electrical terminal 8b and negative ground lead 8bb. Also symbolically illustrated with the symbolic framework of the motor vehicle 2, there is shown a brake lever 9b of a brake switch 9 which has the switch portion 9a with its electrical power inlet terminal 9b and its power electrical outlet terminal 9c. Also illustrated diagrammatically within the framework of the motor vehicle 2, there is illustrated a motion switch 10 and the speed symbolic indicator 10f for indicating when the motor vehicle is in motion, as well as 10 being the zero point when the motor vehicle is not in motion. As well, this motion switch has an electrical power inlet 10a, and alternate power outlets 10b and 10c, the motion switch 10 receiving its indication of motion typically by speedometer cable 10d. There is also symbolically disclosed a flasher unit 11, and a separate flasher unit 12 in the different illustrated circuits.

Accordingly, when the brake lever 9b is depressed, electrical power is transmitted from the electrical power inlet 9d to the body of the switch 9a to the electrical outlet terminal 9c whereby power through the illustrated circuit is conveyed to the switch 10 electrical inlet terminal 10a. While the lever 9b is depressed, if the automobile or motor vehicle is not in motion, electrical power is transmitted from the electrical power inlet terminal 10a to the electrical power outlet terminal 10b. However, when the motor vehicle is in motion, the electrical power is terminated between the power inlet terminal 10a and the electrical power outlet terminal 10b while simultaneously and concurrently electrical circuit is closed between the power inlet terminal 10a and the power outlet terminal 10c. Thus, when as above-described the brake lever 9b is depressed, and the automobile (or other motor vehicle embodying this invention) is not in motion, the lights 6a, 6b and 6c become lighted and flash because of the flasher 11. At this point in time, the lights 7a, 7b and 7c are not lighted. When the brake lever 9b remains or becomes depressed, and concurrently the switch 10 indicates that the motor vehicle is in motion simultaneously or concurrently, at that point in time the electrical current flowing between the power inlet terminal 10a and the power outlet terminal 10c through the flasher unit 12 causes the lights 7a, 7b and 7c to become actuated.

Thus, by the nature of this invention, at an intersection or otherwise, persons in other motor vehicles and/or pedestrians forwardly or on either side of the present motor vehicle carrying the invention above described, are advised when braking is being applied to the vehicle if it is still in motion—by virtue of the flashing red light; but more importantly than that, they are thereafter advised when the motor vehicle is not in motion but when the brake is still applied—by virtue of the flashing green light thereby indicating that the oncoming viewing drivers are free to proceed. Accordingly, if the green light is seen, pedestrians and/or oncoming drivers of other vehicles and/or vehicles of side roads or street or at intersections, are advised that because the green light is lit, they may safely proceed without fear of the green-lighted vehicle causing an accident by potential continued forward motion. It is solely when the green light goes-off, that the pedestrians and/or oncoming drivers and/or drivers at the side roads or streets or intersection, become aware of the fact that the brake is not applied and that the previously-stopped automobile (motor vehicle) may again be in threatening or hazardous motion to pose a threat of collision or some other unpredictable act.

The invention includes variations and modifications that would be apparent to a person of ordinary skill in this art, as well as the substitution of obvious equivalents.

I claim:

1. A motor vehicle signaling-light device comprising in combination: a power source means for providing direct current electricity, having a positive terminal outlet and having a ground negative terminal; a brake switch means for making and breaking electrical circuit, having a brake switch input terminal and having a brake switch output terminal; a brake switch power input circuit including a brake switch power lead connected between said positive terminal outlet and said brake switch input terminal; first forward signal light means including a first forward signal light, for mounting on at least a forwardly-directed face of a motor vehicle, such that any forward signal lights thereof are viewable from at least a forwardly direction and having a first forward light input terminal and forward light output terminal; a motion switch means including a motion switch power input terminal electrically connected to said brake switch output terminal, and at least a first motion switch power outlet terminal, for directing electrical current from the motion switch inlet terminal to said first motion switch power outlet terminal when a vehicle on which the motion switch is mounted is motionless, and for breaking electrical circuit to said first motion switch power inlet terminal when the motor is in motion; and a motion switch first power lead connected between said first motion switch power outlet terminal and said first forward light input terminal; and said brake switch power input circuit additionally including a brake switch circuit ground lead connected between said first forward light output terminal and said main ground negative terminal, whereby said first forward signal light becomes activated by receiving electric power when simultaneously said brake switch means is in a closed circuit state resulting from a brake pedal being depressed when concurrently the motor vehicle is in a motionless state.

2. A motor vehicle signaling-light device of claim 1, in which said first forward signal light means includes second forward light and includes a second forward signal light input and output terminals to and from said second forward signal light, said second forward light outlet terminal being connected electrically in circuit to said main ground negative terminal, and in which said motion switch means includes a second motion switch power outlet terminal; and including a motion switch second power lead connected between said second forward light input terminal and said second motion switch power outlet terminal, said motion switch means being further for making electrical circuit between said motion switch power input terminal and said second motion switch power outlet terminal when the motor vehicle is in motion, and for breaking electrical circuit between said motion switch power input terminal and said second motion switch power outlet terminal when the motor vehicle is in a motionless state, whereby when the brake of the motor vehicle is applied and when the automobile is still in motion the second forward signal light is energized and when the brake remains applied and the motor vehicle ceases its motion, the second forward signal light becomes deactivated and simultaneously the first forward signal light becomes turned-on to provide its light, said first and second lights including physical differences being distinguishable one from the other to a viewer thereof.

3. A motor vehicle signaling-light device of claim 2, including a first message-conveying means for the first light imparting at least some of said physical differences thereto, and including a second and different message-conveying means for the second light imparting at least some of said physical difference, whereby the first and second lights are distinguishable one from the other when respectively lighted.

4. A motor vehicle signaling-light device of claim 3, in which said first message-conveying means comprises a color-imparting structure by which the first light is a first color, and including a second color imparting means by which the second light is a second different color from the first color imparting means, whereby the first light when activated is distinguishable from the second light when activated by virtue of their different colors when observed by a viewer.

5. A motor vehicle signaling-light device of claim 4, in which said first color imparting means causes said first light to impart a green light and in which said second color imparting means causes said second light to impart a red light, when viewed by a viewer.

6. A motor vehicle signaling-light device of claim 5, including first and second side-viewable lights means for mounting on a motor vehicle on a left side and on a right side respectively thereof such that lights of each of the first and second side-viewable light means may be viewed from each of positions to the left and to the right of the motor vehicle, the first side-viewable light means having at least first right and left side lights, first right and left side light electrical power input terminals and a first right and left light ground terminals, and the second side-viewable light means having at least second right and left side lights, second right and left side light electrical power input terminals and second right and left ground terminals, and in which said motion switch first power lead is connected between said first motion switch power outlet terminal and said first right and left side lights, and including second switch lead connected between said second motion switch power outlet terminal and said second right and left side lights, and in which said brake switch circuit ground lead is connected between said main ground negative terminal and each of said first and second side light ground terminals, whereby said first right and left side lights and said first forward light become simultaneously and concurrently electrically energized and lighted when simultaneously the brake is applied and the motor vehicle is motionless, and whereby said second side lights and the second forward light become energized and lighted and viewable when simultaneously the vehicle brake is applied and the motor vehicle is in motion.

7. A motor vehicle signaling-light device of claim 6, in which said color imparting means in association with the first and second side lights causes the first right and left side lights to be viewed as green lights when observed by a viewer and the second right and left side lights to be viewed as red lights when observed by a viewer.

8. A motor vehicle signaling-light device of claim 1, including a color imparting means in association with the first light whereby the first light will cause a green light to be seen when observed by a viewer.

9. A motor vehicle signaling-light device of claim 1, including first and second side-viewable lights means for mounting on a motor vehicle on a left side and on a right side respectively thereof such that lights of each of the first and second side-viewable light means may be viewed from each of positions to the left and to the right of the motor vehicle, the first right and left side-viewable light means having at least first right and left side lights, and the second side-viewable light means having at least a second right and left side lights, said first and second right and left side lights including physical differences such that the first right and left side lights are distinguishable from the second right and left side lights to a viewer thereof, the first side-viewable light means having first right and left side light electrical power input terminals and a first right and left side light ground terminals, and the second side-viewable light means having a second right and left side light electrical power input terminals and a second right and left side light ground terminals, and in which said motion switch first power lead is connected between said first motion switch power outlet terminal and said first right and left side lights, and including a second motion switch power lead connected between said second motion switch power outlet terminal and said second right and left side lights, and in which said brake switch circuit ground lead is connected between said main ground negative terminal and each of said first and second side light ground terminals, whereby said first right and left side lights become simultaneously and concurrently electrically energized and lighted when simultaneously the brake is applied and the motor vehicle is motionless, and whereby said second right and left side lights become energized and lighted and viewable when simultaineously the vehicle brake is applied and the motor vehicle is in motion.

10. A motor vehicle signaling-light device of claim 7, including a first flasher means for causing said first light to flash alternately on and off, when energized.

11. A motor vehicle signaling light device of claim 10, including said first flasher means being connected operatively in electrical circuit with each of said first and second side lights, for causing said first and second side lights to flash alternately off and on, when energized.

12. A motor vehicle signaling light device of claim 9, including said first flasher means being connected operatively in electrical circuit with each of said first and second side lights, for causing said first and second side lights to flash alternately off and on, when energized.

13. A motor vehicle signaling-light device of claim 1, including a first flasher means for causing said first light to flash alternately on and off, when energized.

14. A motor vehicle signaling-light device of claim 1, including a second forward signal light means for mounting on at least a forwardly-directed face of a motor vehicle, such that any lights thereof are viewable from at least a forwardly direction and having a second forward light input terminal and second forward light output terminal, said brake switch circuit ground lead being connected between said second forward light output terminal and said main ground negative terminal, whereby said second light becomes activated by receiving electric power when simultaneously said brake switch means is in a closed circuit state resulting from a brake pedal being applied, and the motor vehicle is in a state of motion.

15. A motor vehicle signaling-light device of claim 14, including a first flasher means for causing said first light to flash alternately on and off, when energized.

16. A motor vehicle signaling light device of claim 15, including said first flasher means being connected operatively in electrical circuit with each of said first and second side lights, for causing said first and second side lights to flash alternately off and on, when energized.

* * * * *